United States Patent
Lin et al.

(10) Patent No.: US 10,103,922 B2
(45) Date of Patent: Oct. 16, 2018

(54) METHODS, DEVICES PERTAINING TO TRANSMISSION OF MULTI-CARRIER SIGNAL

(71) Applicant: ORANGE, Paris (FR)

(72) Inventors: Hao Lin, Rennes (FR); Pierre Siohan, Rennes (FR)

(73) Assignee: ORANGE, Paris (FR)

(*) Notice: Subject to any disclaimer, the term of this patent is extended or adjusted under 35 U.S.C. 154(b) by 68 days.

(21) Appl. No.: 14/916,431

(22) PCT Filed: Sep. 2, 2014

(86) PCT No.: PCT/FR2014/052164
§ 371 (c)(1),
(2) Date: Mar. 3, 2016

(87) PCT Pub. No.: WO2015/033051
PCT Pub. Date: Mar. 12, 2015

(65) Prior Publication Data
US 2016/0197758 A1    Jul. 7, 2016

(30) Foreign Application Priority Data
Sep. 3, 2013  (FR) ..................... 13 58415

(51) Int. Cl.
*H04L 27/26* (2006.01)
*H04L 5/00* (2006.01)

(52) U.S. Cl.
CPC ...... *H04L 27/2644* (2013.01); *H04L 27/2607* (2013.01); *H04L 27/2627* (2013.01);
(Continued)

(58) Field of Classification Search
CPC ............. H04L 27/2644; H04L 27/2649; H04L 27/2627; H04L 27/2607; H04L 27/264; H04L 5/0044
See application file for complete search history.

(56) References Cited

U.S. PATENT DOCUMENTS

2004/0125740 A1* 7/2004 Gardner ............ H04B 1/69
                                                  370/208

FOREIGN PATENT DOCUMENTS

EP    2608474 A1    6/2013

OTHER PUBLICATIONS

Gaspar Ivan et al., "Low Complexity GFDM Receiver Based on Sparse Frequency Domain Processing", 2013 IEEE 77th Vehicular Technology Conference (VTC Spring), IEEE, Jun. 2, 2013 (Jun. 2, 2013), pp. 1-6, XP032548023.
(Continued)

*Primary Examiner* — Omar J Ghowrwal
(74) *Attorney, Agent, or Firm* — David D. Brush; Westman, Champlin & Koehler, P.A.

(57) ABSTRACT

A method is provided for transmitting complex data symbols, supplying a multiple carrier signal. The method includes shaping at least one block of M×K complex data symbols, where M>1 and K>1, implementing the following acts: for at least one column of the block, conversion of the M complex data symbols of the column from the frequency domain to the time domain, supplying N converted symbols; cyclic repetition of the N converted symbols, supplying NK repeated symbols; cyclic repetition of the transformed N symbols, supplying NK repeated symbols; filtering the NK repeated symbols via a shaping filter, supplying NK filtered symbols; and summation of the obtained filtered symbols for the various columns of the block, supplying NK time samples.

22 Claims, 7 Drawing Sheets

(52) U.S. Cl.
CPC ........ *H04L 27/2649* (2013.01); *H04L 5/0044* (2013.01); *H04L 27/264* (2013.01)

(56) References Cited

OTHER PUBLICATIONS

Michailow et al., "Generalized Frequency Division Multiplexing : An Analysis of an Alternative Multi-Carrier Technique for Next Generation Cellular Systems" International Symposium on Wireless Communication System (ISWCS'12), Paris, France, Aug. 2012.
Fettweis et al., "GFDM—Generalized Frequency Division Multiplexing", IEEE Vehicular Technology Conference, Barcelona, Spain, Apr. 2009.
Rohit Datta et al., "FBMC and GFDM Interference Cancellation Schemes for Flexible Digital Radio PHY Design", Digital System Design (DSD), 2011 14th Euromicro Conference on, IEEE, Aug. 31, 2011, pp. 335-339, XP032058647.
Rohit Datta et al., "Comparative Analysis on Interference Suppressive Transmission Schemes for White Space Radio Access", vehicular technology conference (VTC Spring), 2012 IEEE 75th, IEEE, May 6, 2012, pp. 1-5, XP032202455.
English Translation of the International Search Report and Written Opinion dated Oct. 21, 2014 for International Application No. PCT/EP2014/052164 filed Sep. 2, 2014.

\* cited by examiner

METHODS, DEVICES PERTAINING TO TRANSMISSION OF MULTI-CARRIER SIGNAL

1. CROSS-REFERENCE TO RELATED APPLICATIONS

This application is a Section 371 National Stage Application of International Application No. PCT/FR2014/052164, filed Sep. 2, 2014, the content of which is incorporated herein by reference in its entirety, and published as WO 2015/033051 on Mar. 12, 2015, not in English.

2. FIELD OF THE INVENTION

The field of the invention is that of communications that implement multicarrier modulation.

More specifically, the invention pertains to a novel technique for transmitting communications data on a GFDM ("Generalized Frequency Division Multiplexing") type carrier multiplex.

The invention can find application especially in the field of wireless communications (DAB, DVB-T, WLAN, non-guided optics, etc.) or wired communications (xDSL, PLC, optics, etc.). For example, the invention finds application in cell communications, on uplinks and downlinks, machine-to-machine (M2M) communications and especially for future-generation cell radio systems.

3. PRIOR ART

GFDM transmission, as presented in « *GFDM-Generalized Frequency Division Multiplexing* » (Fettweis and al., IEEE Vehicular Technology Conference, Barcelona, Spain, April 2009), was initially proposed for communications in the white spaces and then became a reference for the physical layer in the context of smart or cognitive radio, because of its good frequency properties.

Such a transmission technique especially has high capacity of resistance to long echoes through the introduction of a cyclic prefix (CP), and gives a signal having a better frequency concentration than a signal obtained with OFDM modulation and the introduction of a cyclic prefix.

The general principal of GFDM transmission relies on the idea of bringing together a set of data symbols of a time-frequency network into a single block. Then, for each block, a sub-carrier processing is carried out. This sub-carrier processing includes an over-sampling and the shaping of the signal by a technique of filtering in the frequency domain. This gives a spectrum that is improved as compared with that of the OFDM system and its rectangular window.

These processing operations produce a baseband multi-carrier GFDM signal which, for a block of incoming data symbols, is expressed by:

$$s[k] = \sum_{m=0}^{M-1} \sum_{n=0}^{K-1} c_m[n] \frac{\tilde{g}[k-nN]e^{\frac{j2\pi mk}{M}}}{\tilde{g}_{m,n}[k]}$$

with: M being the number of sub-carriers, i.e. the number of rows of the block;
K the number of data symbols per time slot, i.e. the number of columns of the block;
N the over-sampling factor (with $N \geq M$);

$c_m[n]$ the data symbols, with n the index of the data symbol in the time slot (i.e. of the column of the block), $0 \leq n \leq K-1$, and m the index of the sub-carrier (i.e. of the row of the block), $0 \leq m \leq M-1$;

$\tilde{g}[k]$ a shaping filter obtained by periodic repetition of the prototype filter $g[k]$ on a period NK, such that $\tilde{g}[k]=g[\mathrm{mod}(k, NK)]$.

FIG. 1 illustrates especially the structure of a baseband GFDM transmultiplexer implementing the following for a block of data symbols:

on the sending side:
    a step of expansion/over-sampling 11 of the data symbols by an over-sampling factor N, implemented sub-carrier by sub-carrier,
    a step of filtering 12 by the shaping filter $\tilde{g}[k]$(i.e. by circular convolution of the prototype filter $g[k]$),
    a step of modulation 13, delivering the multicarrier signal $s[k]$; and on the receiving side:
    a step of demodulation 14,
    a step of filtering 15 by the shaping filter $\tilde{g}[k]$ (i.e. by circular convolution of the prototype filter $g[k]$),
    a step of decimation 16 by the over-sampling factor N, implemented sub-carrier by sub-carrier.

One drawback of this technique is that the over-sampling/expansion functions are implemented in the frequency domain, sub-carrier by sub-carrier. As indicated here above, this makes it possible to obtain an improved spectrum as compared with the OFDM system and its rectangular window, but the consequence is that GFDM produces a non-orthogonal system of modulation.

In addition to the absence of orthogonality, it can be noted that such a GFDM transmultiplexer presents a high complexity. In particular, its complexity is higher than the complexity of an OFDM transmultiplexer with cyclic prefix.

As an alternative, the GFDM can be represented by a matrix model in such a way that it immediately leads to a direct implementation of the GFDM transmitter.

However, the complexity of carrying out this direct implementation requires a very large number of operations, of the order of $NMK^2$ complex multiplications. This modulation therefore becomes far too complex to be envisaged in practice for a great value of M or of K.

In the search for a high-performance algorithm for implementing the GFDM, the document "*Generalized Frequency Division Multiplexing: An Analysis of an Alternative Multi-Carrier Technique for Next Generation Cellular Systems*" (Michailow and al., International Symposium on Wireless Communication System (ISWCS'12), Paris, France, August 2012) proposes a technique based on the use of Fourier transforms. A part of the operations are thus carried out in the frequency domain, in taking advantage of the fact that circular convolution in the time domain is equivalent to a product in the frequency domain. Moreover, additional gain is obtained from the fact that the prototype filter can be reduced to few coefficients in the frequency domain.

In mathematical terms, this algorithm, also called SoA, can be written as follows:

$$s[k] = \sum_{m=0}^{M-1} s_m[k]$$

$$\text{With } s_m[k] = IDFT_{NK}\left( \begin{array}{c} DFT_{NK}(c_m[n]\delta(k-nN)) \times \\ DFT_{NK}(g[k]) * DFT_{NK}(e^{\frac{j2\pi mk}{N}}) \end{array} \right)$$

where $IDFT_{NK}(\bullet)$ and $DFT_{NK}(\bullet)$ correspond respectively to the inverse discrete Fourier transform sized NK and the forward discrete Fourier transform sized NK,
* is the circular convolution operator, and
δ designates the Kronecker symbol.

Since the forward and inverse discrete Fourier transforms can be computed efficiently by the IFFT/FFT (Inverse Fast Fourier Transform or Fast Fourier Transform) type algorithms, the implementing of a transmultiplexer based on this algorithm is considered to be efficient.

However, after a detailed analysis of this technique, it is observed that the operational complexity expressed in number of complex operations (CM) is expressed by:

$$CM = \frac{KN}{2}\log_2 N + \frac{(M+N)K}{2}\log_2 K + MLK$$

where L is the span factor, indicating the number of payload (i.e. non-zero) coefficients of the shaping filter taken into account in the frequency domain.

One drawback of this technique is that its operational complexity depends on the span factor L. In addition, if the orthogonality aspect is taken into account, it is seen that the effective complexity is higher than that indicated for the SoA algorithm in "*Generalized Frequency Division Multiplexing: Analysis of an Alternative Multi-Carrier Technique for Next Generation Cellular Systems*" for L equal to 2. This technique therefore does not link the criteria of complexity to the orthogonality of the resulting system. This is reflected in a loss of performance between implementation in direct form as presented in the document "*GFDM-Generalized Frequency Division Multiplexing*" and implementation with reduced complexity as presented in the document "*Generalized Frequency Division Multiplexing: Analysis of an Alternative Multi-Carrier Technique for Next Generation Cellular Systems*".

There is therefore a need for a novel technique of GFDM type transmission that does not have all the drawbacks of the prior art.

4. SUMMARY OF THE INVENTION

The invention proposes a novel solution that does not have all these drawbacks of the prior art, in the form of a method for transmitting complex data symbols that is to be implemented in a telecommunications system, delivering a multi-carrier signal.

According to the invention, such a method comprises a step for shaping at least one block of M×K complex data symbols with M>1 and K>1, implementing the following steps:
for at least one column of the block:
  transformation of the M complex data symbols of the column from the frequency domain to the time domain, delivering N transformed symbols with N≥M;
  cyclic repetition of the N transformed symbols, delivering NK repeated (transformed) symbols;
  filtering, the NK repeated (transformed) symbols by means of a shaping filter, delivering NK filtered (repeated transformed) symbols; and
summing the filtered (repeated transformed) symbols obtained for the different columns of the block, delivering NK time samples forming the multi-carrier signal.

The invention thus proposes a novel technique for implementing a GFDM type transmission used to generate a multi-carrier signal from blocks of data symbols.

In particular, the proposed solution enables a fast implementation of a GFDM type transmultiplexer which is less complex to implement than in the prior-art techniques. In particular, the complexity of the transmultiplexer according to the invention does not depend on the span factor L.

To this end, the transmission technique according to the invention implements, for at least one block of complex data symbols (or possibly real) data symbols, a transformation/conversion of the data symbols from the frequency domain to the time domain, carried out column by column. This makes it possible especially to use a small-sized inverse transform to pass from the frequency domain to the time domain and to carry out the step of filtering in the time domain.

On the contrary, in the prior art, the filtering is done in the frequency domain and then a large inverse transform is necessarily applied to pass from the frequency domain to the time domain.

In particular, the step of transformation implements an inverse fast Fourier transform sized N×N applied to the M data symbols if N=M, and applied to the M data symbols complemented by (N−M) zero symbols if N>M.

Such an algorithm is particularly efficient and easy to implement, especially in a transmission device, for example using a Cooley-Tukey type or Good type algorithm.

According to one particular characteristic of the invention, the step for shaping at least one block of M×K data symbols delivers a multi-carrier signal such that:

$$s_{NK\times 1}=\text{diag}\{G_{NK\times K}(E_{NK\times N}W_{N\times N}C_{N\times K})^T\}$$

with: $C_{N\times K}=\{c_m[n]\}_{N\times K}$ being the block of data symbols, complemented by zero elements if N>M, for 0≤n≤K−1, 0≤m≤M−1;

$$W_{N\times N} = \{e^{\frac{j2\pi km}{M}}\}_{N\times N}$$

the matrix representing the step of transformation from the frequency domain to the time domain, for 0≤k≤N−1, 0≤m≤N−1;

$E_{NK\times N}$ the matrix representing the cyclic repetition step such that $E_{NK\times N}^T=[I_{N\times N} \cdots I_{N\times N}]_{N\times NK}$;

$G_{NK\times K}=\{\tilde{g}^{k,n}\}_{NK\times K}=\{g[\text{mod}(k-nN,NK)]\}_{NK\times K}$ is the matrix representing the step of filtering by the shaping filter $\tilde{g}[k]$, obtained by periodic repetition of a prototype filter g[k] on a period NK and such that $\tilde{g}[k]=g[\text{mod}(k, NK)]$, for 0≤k≤NK−1, 0≤n≤K−1;

$(\bullet)^T$ the matrix transpose operator;

diag{•} the operator for extracting the diagonal elements of a matrix.

The transmission algorithm can thus be written in matrix form, thus providing for simple and efficient implementing of a GFDM type transmitter.

According to one particular aspect of the invention, the shaping filter is a square-root raised cosine filter.

In particular, the shaping filter is a modified square-root raised cosine filter comprising, in the frequency domain, zero coefficients and non-zero coefficient, and approximate value of the support L of the non-zero coefficients of this filter is such that:

$$L = 2\left\lceil \frac{K(1+\alpha)}{2} \right\rceil - 1,$$

with $\lceil \cdot \rceil$ being the rounded-up integer part operator and $\alpha$ being the roll-off factor of the shaping filter.

In particular, the shaping filter is a modified square-root raised cosine filter such that:

$$L = 2\left\lceil \frac{K}{2} \right\rceil - 1,$$

with $\alpha=0$.

By thus modifying the shaping filter, it is seen that the sub-carriers of the multi-carrier signal are almost orthogonal. Thus, according to the invention, a quasi-orthogonal GFDM type transmission system is defined, approaching the OFDM transmission system.

According to one particular characteristic of the invention, the method for transmitting furthermore comprises a step for inserting a guard interval.

In particular, the method for transmitting according to the invention comprises a step for inserting a cyclic prefix before at least one time sample forming the multi-carrier signal, said cyclic prefix, of a length $L_{CP}=L_{GI}+L_{RI}$, comprising a first portion with a length $L_{GI}$, used to absorb the interference due to the transmission channel, and a second portion with a length $L_{RI}$, used to improve the power spectrum of the multi-carrier signal, and a step for windowing the multi-carrier signal implementing the following steps:

multiplying each of the time samples forming the multi-carrier signal and the cyclic prefix by a windowing coefficient, delivering $KN+L_{CP}$ windowed samples;

over-sampling the windowed samples by an over-sampling factor $Q=KN+L_{GI}$, delivering $KN+L_{CP}$ over-sampled samples;

shifting and summing the over-sampled samples, delivering a windowed multi-carrier signal. In particular, the windowed multi-carrier signal $s_{WCP\text{-}GFDM}[k]$ is such that:

$$s_{WCP\text{-}GFDM}[k] = \sum_{r=l-1}^{l+1} s[\mathrm{mod}(k - L_{CP}, KN)] h[k - r(KN + L_{GI})]$$

with: $s[k]$ being the multi-carrier signal before insertion of the cyclic prefix;

l the index of the block considered;

$h[k]$ a window function;

r an integer taken in the interval $[l-1, l+1]$.

The introduction of a cyclic prefix, or more generally a guard interval, offers the possibility of preserving perfect orthogonality (or almost perfect orthogonality depending on the choice of the parameters) in the presence of a multi-path channel and of giving a multi-carrier signal having high power spectral density by the application of a window.

In another embodiment, the invention pertains to a device for transmitting complex data symbols to be implemented in a telecommunications system, delivering a multi-carrier signal.

According to the invention, such a device comprises a module for shaping at least one block of M×K complex data symbols, with M>1 and K>1, comprising the following modules activated for at least one column of the block:

a module for transforming the M complex data symbols of the column from the frequency domain to the time domain, delivering N transformed symbols with N≥M;

a module for the cyclic repetition of the N transformed symbols, delivering NK repeated (transformed) symbols;

a filtering module for filtering the NK repeated (transformed) symbols by means of a shaping filter, delivering NK filtered (repeated transformed) symbols; and a module for summing the filtered (repeated transformed) symbols obtained for the different columns of the block, delivering NK time samples forming the multi-carrier signal.

Such a transmission device is especially suited to implementing the above-described method for transmitting. It is for example a base station of a cell network for communications on a downlink channel or a terminal of the computer, telephone, tablet, set-top box or other type for communications on an uplink channel.

This device could of course comprise the different characteristics of the method for transmitting according to the invention which can be combined or taken in isolation. Thus, the characteristics and advantages of this device are the same as those of the method described here above. They are therefore not described in more ample detail.

In particular, the proposed solution enables the performance of GFDM type transmission by using a scheme different from that of the prior art, having especially lower complexity than in the prior art schemes.

The invention also pertains to a method for receiving a multi-carrier signal, to be implemented in a telecommunications system, delivering estimated complex data symbols, said multi-carrier signal being obtained by shaping at least one block of M×K complex data symbols when sending, with M>1 and K>1.

According to the invention, the method for receiving comprises a step for estimating at least one complex data symbol of the block, implementing the following steps:

obtaining a multi-carrier signal comprising NK samples, with N≥M;

filtering the NK samples by means of a shaping filter, delivering NK filtered samples;

distributing the NK filtered samples amongst K groups of N filtered samples;

summing the filtered samples of the K groups delivering N filtered symbols;

transforming of the N filtered symbols from the time domain to the frequency domain, delivering M estimated complex data symbols.

The invention thus proposes a novel technique for implementing a GFDM type reception making it possible to estimate complex data symbols of at least one block of data symbols.

As already indicated, the proposed solution enables a fast implementation of a GFDM type transmultiplexer and offers low implementation complexity as compared with the prior-art techniques. In particular, the complexity of the transmultiplexer according to the invention does not depend on the span factor L.

Such a method for receiving is especially suited to receiving a multi-carrier signal sent out by the method for transmitting described here above. The characteristics and advantages of this method for receiving are the same as those of the method for transmitting. They are therefore not described in more ample detail.

In particular, the step of transformation implements a fast Fourier transform sized N×N and, if N>M, an extraction of the M first transformed filtered symbols, delivering the M estimated complex data symbols.

It may be recalled that such an algorithm is particularly efficient and easy to implement, especially in a device for receiving, for example by using a Cooley-Tukey type or Good type algorithm.

In particular, the step for estimating at least one complex data symbol of the block delivers an estimated complex data symbol at the position $(m_0, n_0)$, such that:

$$y_{m_0,n_0} = \sum_{k=0}^{M-1} \sum_{l=0}^{K-1} s[k+lM]\tilde{g}[k+lM-n_0N]e^{-\frac{j2\pi m_0(k-n_0N)}{M}}$$

with: $s[k]$ being the multi-carrier signal;
$\tilde{g}[k]$ being the shaping filter.

The reception algorithm can thus be written in mathematical form, enabling direct implementation of a GFDM type receiver.

According to another aspect, the step for estimating at least one complex data symbol of the block delivers an estimated complex data symbol at the position $(m_0, n_0)$, such that:

$$y_{N\times 1} = W_{N\times N}{}^H E_{NK\times N}{}^T D_{NK\times NK} s_{NK\times 1}$$

with: $W_{N\times N}{}^H$ being the matrix representing the step of transformation from the time domain to the frequency domain;

$E_{NK\times N}{}^T = [I_{N\times N} \ldots I_{N\times N}]_{N\times NK}$ being the matrix representing distributing and summing steps;

$D_{NK\times NK} = \text{diag}(g^{k,n})$ being the matrix representing the step of filtering by means of the shaping filter $\tilde{g}[k]$, obtained by periodic repetition of a prototype filter $g[k]$ over a period NK and such that $\tilde{g}[k] = g[\text{mod}(k, NK)]$, with $g^{k,n}$ being the coefficients of the shaping filter, diag{•} being the operator for extracting the diagonal elements of a matrix, $0 \leq n \leq K-1$, and $0 \leq k \leq NK-1$;

$s_{NK\times 1}$ a vector representing the NK samples of the multi-carrier signal;

$(\bullet)^T$ the matrix transpose operator;
$(\bullet)^H$ the matrix conjugate-transpose operator.

The reception algorithm can thus be written in a matrix form, thus enabling a simple and efficient implementation of a GFDM type receiver.

According to one particular characteristic of the invention, the method for receiving furthermore comprises a preliminary step for eliminating a guard interval.

In particular, prior to the step for estimating, the method for receiving implements the following steps:

elimination, from the multi-carrier signal, of a first portion of a cyclic prefix having a length $L_{CP}=L_{GI}+L_{RI}$ inserted when sending, said first portion having a length $L_{GI}$ and being used to absorb the interference due to the transmission channel;

cyclic shifting of the multi-carrier signal obtained from the elimination step, such that $s[k]=s[\text{mod}(k+L_{GI}, KN)]$, delivering NK time samples;

transformation of the NK time samples from the time domain to the frequency domain, delivering NK frequency samples;

equalization of the NK frequency samples, delivering NK equalized samples;

transformation of the NK equalized samples from the frequency domain to the time domain.

According to this example, the equalization is therefore implemented before the GFDM demodulation.

As a variant, according to another particular characteristic of the invention, the method for receiving implements the following steps prior to the step for estimating:

elimination, from the multi-carrier signal, of a first portion of a cyclic prefix with a length $L_{CP}=L_{GI}+L_{RI}$ inserted when sending, said first portion having a length $L_{GI}$ and being used to absorb the interference due to the transmission channel;

cyclic shifting of the multi-carrier signal obtained from the elimination step, such that $s[k]=s[\text{mod}(k+L_{GI}, KN)]$, delivering NK time samples.

In addition, the step for estimating implements a step of equalization of the transformed symbols.

According to this example, the equalization is therefore implemented after the GFDM demodulation.

In another embodiment, the invention pertains to a device for receiving a multi-carrier signal, to be implemented in a telecommunications system, delivering estimated complex data symbols, said multi-carrier signal being obtained by shaping, when sending, at least one block of M×K complex data symbols, with M>1 and K>1.

According to the invention, such a device for receiving comprises a module for estimating at least one complex data symbol of the block, comprising:

a module for obtaining a multi-carrier signal comprising NK samples, with $N \geq M$;

a filtering module for filtering the NK samples by means of a shaping filter, delivering NK filtered samples;

a module for distributing the NK filtered samples amongst K groups of N filtered samples;

a module for summing the filtered samples of the K groups, delivering N filtered symbols;

a module for transforming the N filtered symbols from the time domain to the frequency domain, delivering M estimated complex data symbols.

Such a device for receiving is especially adapted to implementing the method for receiving described here above. It is for example a base station of a cell network for a communications on an uplink channel or a terminal of a computer, telephone, tablet, set-top box or other type for communications on a downlink channel. This device could of course comprise the different characteristics pertaining to the method for receiving according to the invention, which can be combined or taken in isolation. Thus, the characteristics and the advantages of the device are the same as those in the method described here above. As a consequence, they are not described in more ample detail.

The invention also pertains to one or more computer programs comprising instructions for implementing a method for transmitting as described here above when this program or these programs are executed by a processor, and one or more computer programs comprising instructions to implement a method for receiving as described here above when these programs are executed by a processor.

The methods according to the invention can therefore be implemented in a variety of ways, especially in wired form and/or software form.

The invention also pertains to one or more computer-readable information carriers, comprising instructions of one or more computer programs as mentioned here above.

5. LIST OF FIGURES

Other features and advantages of the invention shall appear more clearly from the following description of a particular embodiment given by way of a simple, illustrative and non-exhaustive example and from the appended drawings, of which:

FIG. 1 presents a GFDM transmultiplexer according to the prior art;

FIG. 2 presents the main steps implemented by the method for transmitting according to one particular embodiment of the invention;

Figure 3:
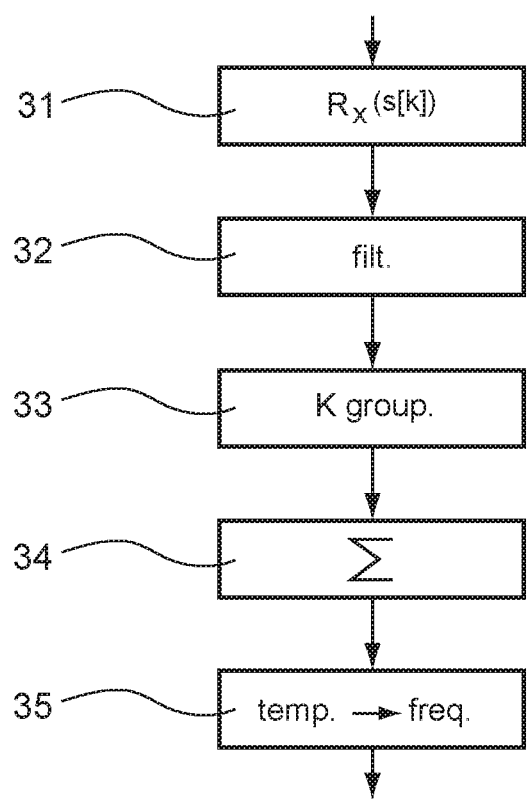
FIG. 3 illustrates the main steps implemented by the method for receiving according to one particular embodiment of the invention.
Figure 5A:
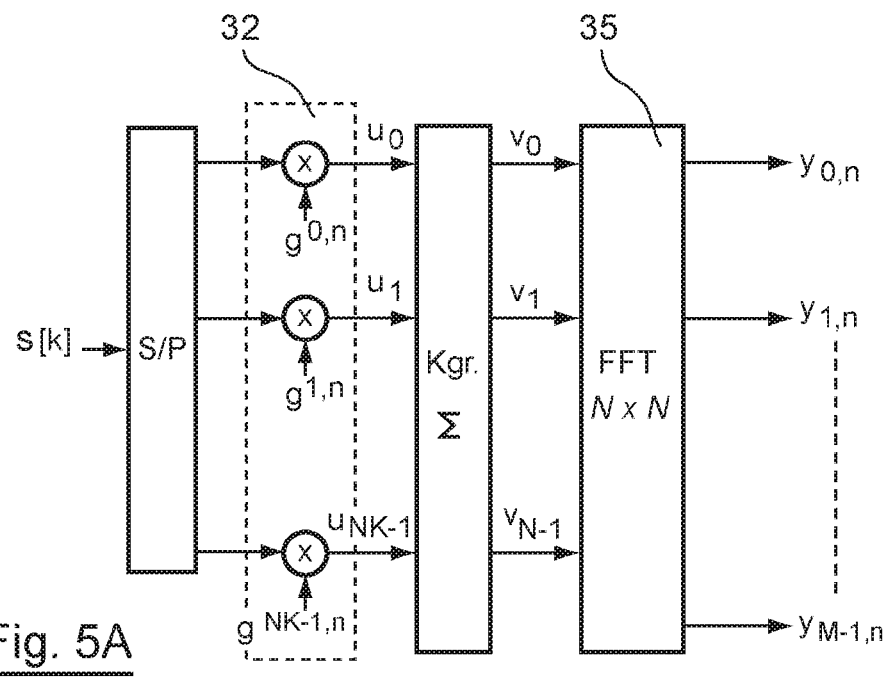
Figure 5B:
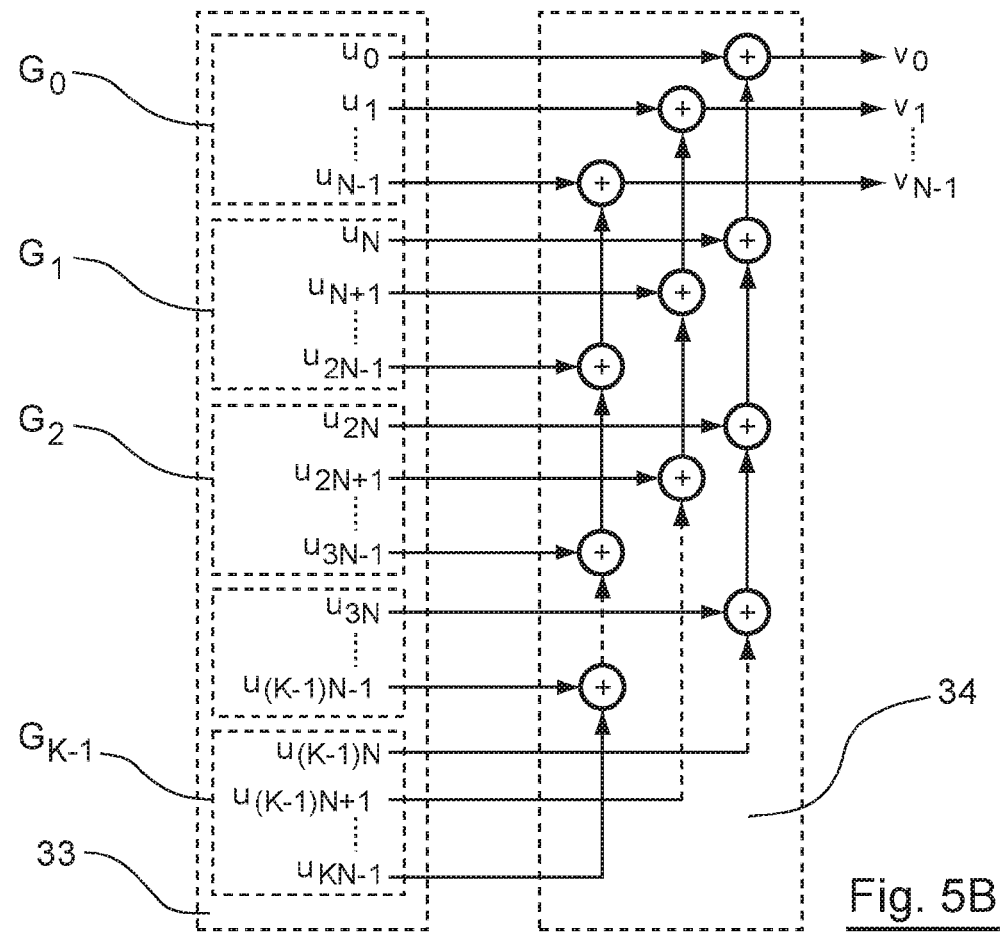
Figure 6:
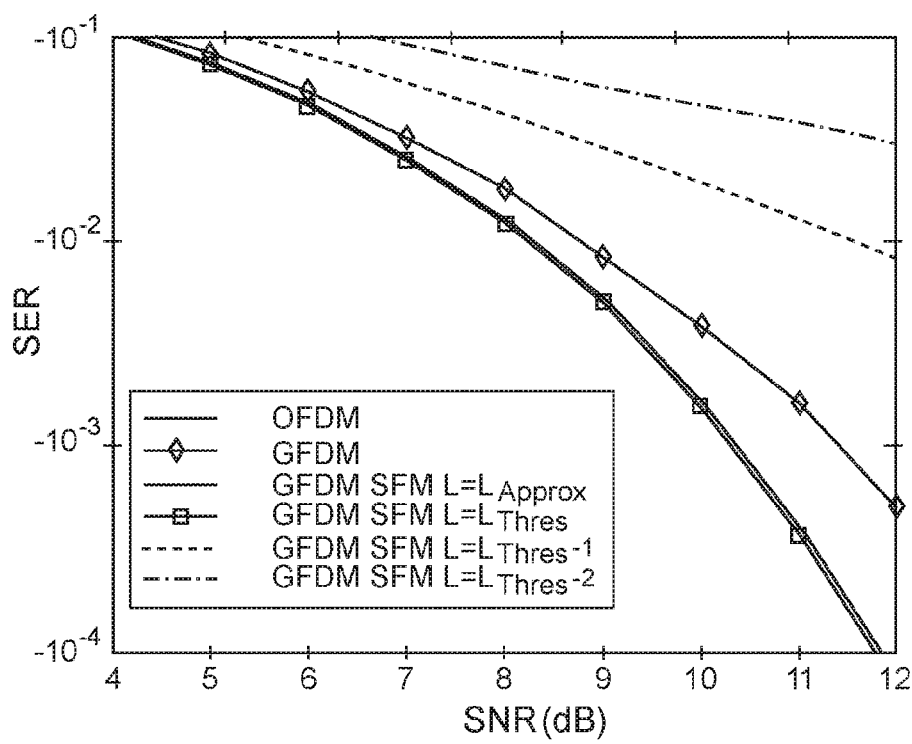
Figure 7:
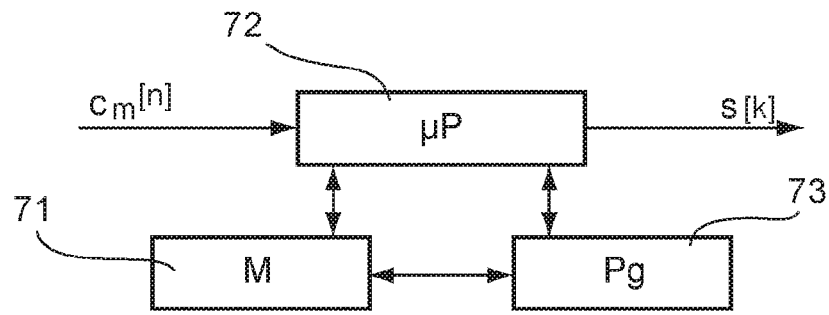
Figure 8:
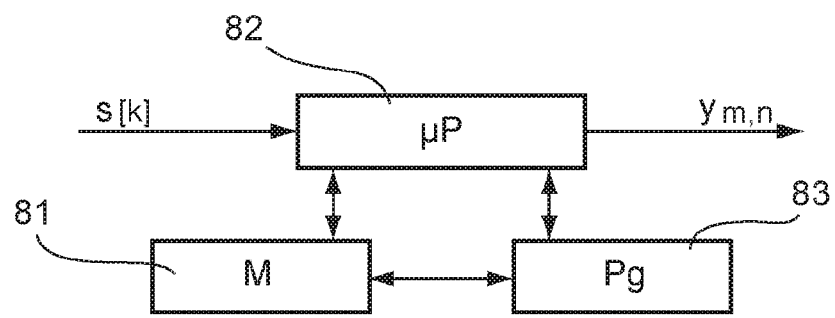
Figure 9:
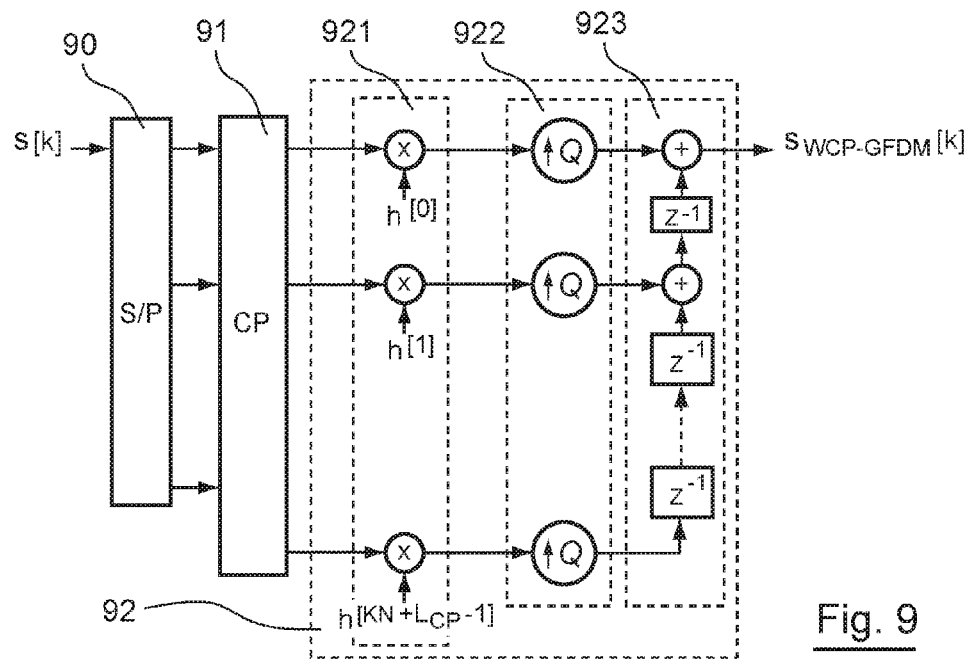
Figure 11:
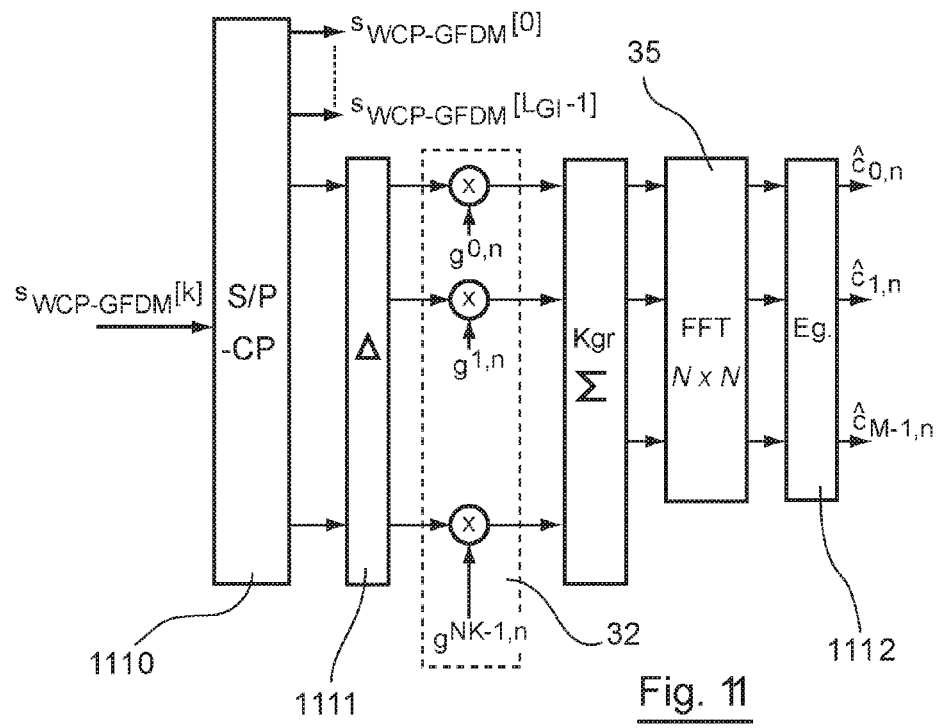
Figure 10:
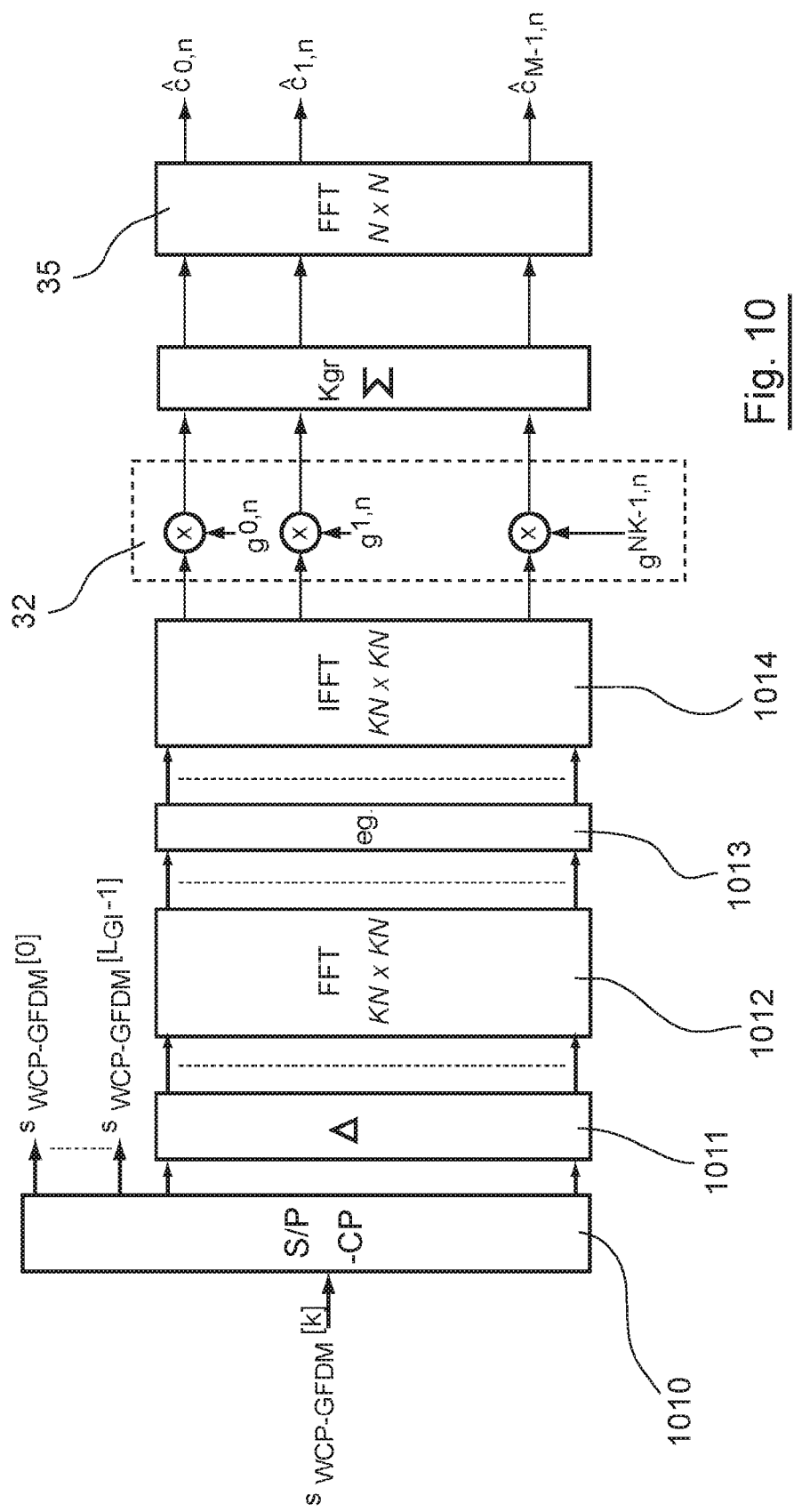

FIGS. 5A and 5B present an example of a GFDM type receiver implementing the steps of FIG. 3;

FIG. 6 compares the performance of the OFDM type transmission techniques and GFDM type transmission techniques with or without implementation of a technique for optimizing the shaping filter;

FIGS. 7 and 8 respectively illustrate the simplified structure of a transmission device implementing a technique of transmission and a reception device implementing a technique of reception according to one particular embodiment of the invention;

FIG. 9 illustrates one particular embodiment of the invention relying on the insertion of a cyclic prefix and a windowing operation;

FIGS. 10 and 11 present two examples of implementation of a receiver according to the particular embodiment of the invention relying on the insertion of a cyclic prefix and a windowing operation.

6. DESCRIPTION OF ONE EMBODIMENT OF THE INVENTION

6.1 General Principle

The general principle of the invention relies on a novel technique for implementing GFDM type transmission/reception, implementing, on the sending side, a transformation of the complex data symbols (which could possibly have a zero imaginary part) from the frequency domain to the time domain, prior to the filtering step.

This enables especially the performance of the filtering operation in time and not in frequency and thus averts the computation of a large-sized transform from the frequency domain to the time domain at the last step of the transmission algorithm.

In particular, the invention proposes a modified shaping filter having specific span parameters (L) and roll-off factor α making it possible to approach an orthogonal system.

Figure 2:
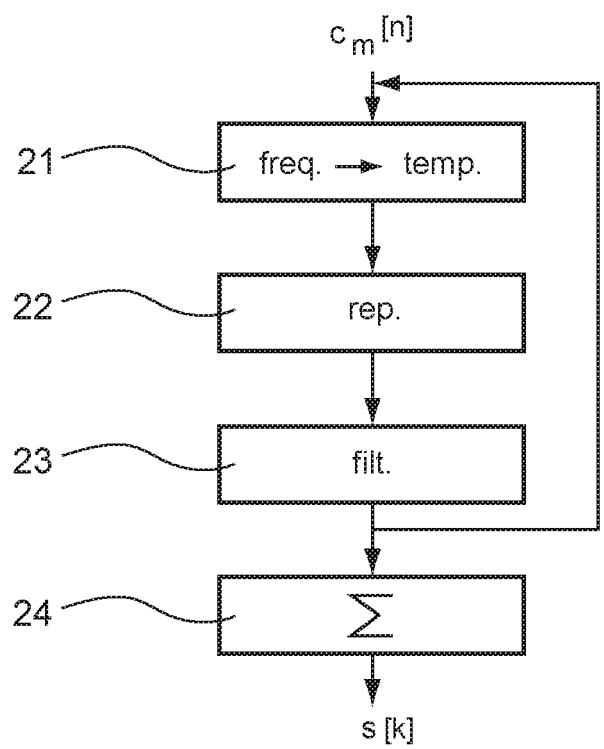

Here below, referring to FIG. 2, we present the main steps implemented by a method for transmitting according to one embodiment of the invention.

Such a method inputs at least one block of M×K real-value or complex-value data symbols with M>1 and K>1. These data symbols are denoted as $c_m[n]$, with n being the index of the data symbol in the time slot (i.e. of the column of the block), $0 \leq n \leq K-1$, and m being the index of the sub-carrier (i.e. of the line of the block), $0 \leq m \leq M-1$.

For the shaping of a block of M×K data symbols, the method implements a succession of steps for at least one column n of the block of data symbols and more generally for all the columns of the block.

More specifically, during a first step 21, the M data symbols of the $n^{th}$ column of the block are transformed from the frequency domain to the time domain, so as to obtain N transformed symbols, with N≥M.

In particular, it is noted that if N>M, the $n^{th}$ column of the block can be complemented by zero symbols so as to use an N×N sized transform from the frequency domain to the time domain.

Then, during a second step 22, a cyclic repetition of the N transformed symbols is carried out, delivering NK repeated transformed symbols. In other words, the N transformed symbols are repeated K times.

In a third step 23, the NK repeated transformed symbols are filtered by a shaping filter delivering NK filtered repeated transformed symbols, also called more simply filtered symbols.

These three steps can be repeated for the different columns of the block of symbols.

Finally, during a fourth step 24, the filtered symbols obtained for the different columns of the block are summed to obtain NK time samples forming the multi-carrier signal. In other words, the first filtered symbol obtained for the first column of the block, the first filtered symbol obtained for the second column of the block, . . . , the first filtered symbol obtained for the $K^{th}$ column of the block are added up to obtain a first time sample. Then, the second filtered symbol obtained for the first column of the block, the second filtered symbol obtained for the second column of the block, . . . , the second filtered symbol obtained for the $K^{th}$ column of the block are added up to obtain a second time sample. The process is continued in the same way for all the NK filtered symbols, so as to obtain NK time samples forming the multi-carrier signal.

FIG. 3 illustrates the main steps implemented for a method for receiving a multi-carrier signal obtained by the shaping, when sending, of at least one block of M×K data symbols, with M>1 and K>1, according to one embodiment of the invention.

More specifically, for the estimation of at least one data symbol of the block, the method for receiving implements a succession of steps.

Thus, during a first step 31, we obtain a multi-carrier signal comprising NK samples, with N≥M.

During a second step 32, a filtering is applied by a shaping filter for the NK samples, delivering NK filtered samples.

During a third step 33, the NK filtered samples are distributed into K groups each comprising N filtered samples. For example, the N first filtered samples belong to a first group, the N following filtered samples belong to a second group and so on and so forth and the N last filtered samples belong to a $K^{th}$ group.

During a fourth step 34, the filtered samples of the K groups are summed up, delivering N filtered symbols. In other words, the first filtered sample of the first group, the first filtered sample of the second group, . . . , the first filtered sample of the $K^{th}$ group are added up so as to obtain a first filtered symbol. The second filtered sample of the first group, the second filtered sample of the second group, . . . , the second filtered sample of the $K^{th}$ group, are all added up to obtain a second filtered symbol. The procedure continues in this way for the NK filtered samples so as to obtain N filtered symbols.

During a following step 35, the N filtered symbols are transformed from the time domain to the frequency domain so as to obtain M estimated data symbols.

In particular, it is noted that if N>M, it is possible to extract the M first filtered symbols coming from the transformation step so as to use an N×N sized transform from the time domain to the frequency domain.

6.2 Description of One Particular Embodiment

Here below, we describe an example of implementation of the invention for the transmission of at least one block of data symbols according to a GFDM type technique.

Figure 4:
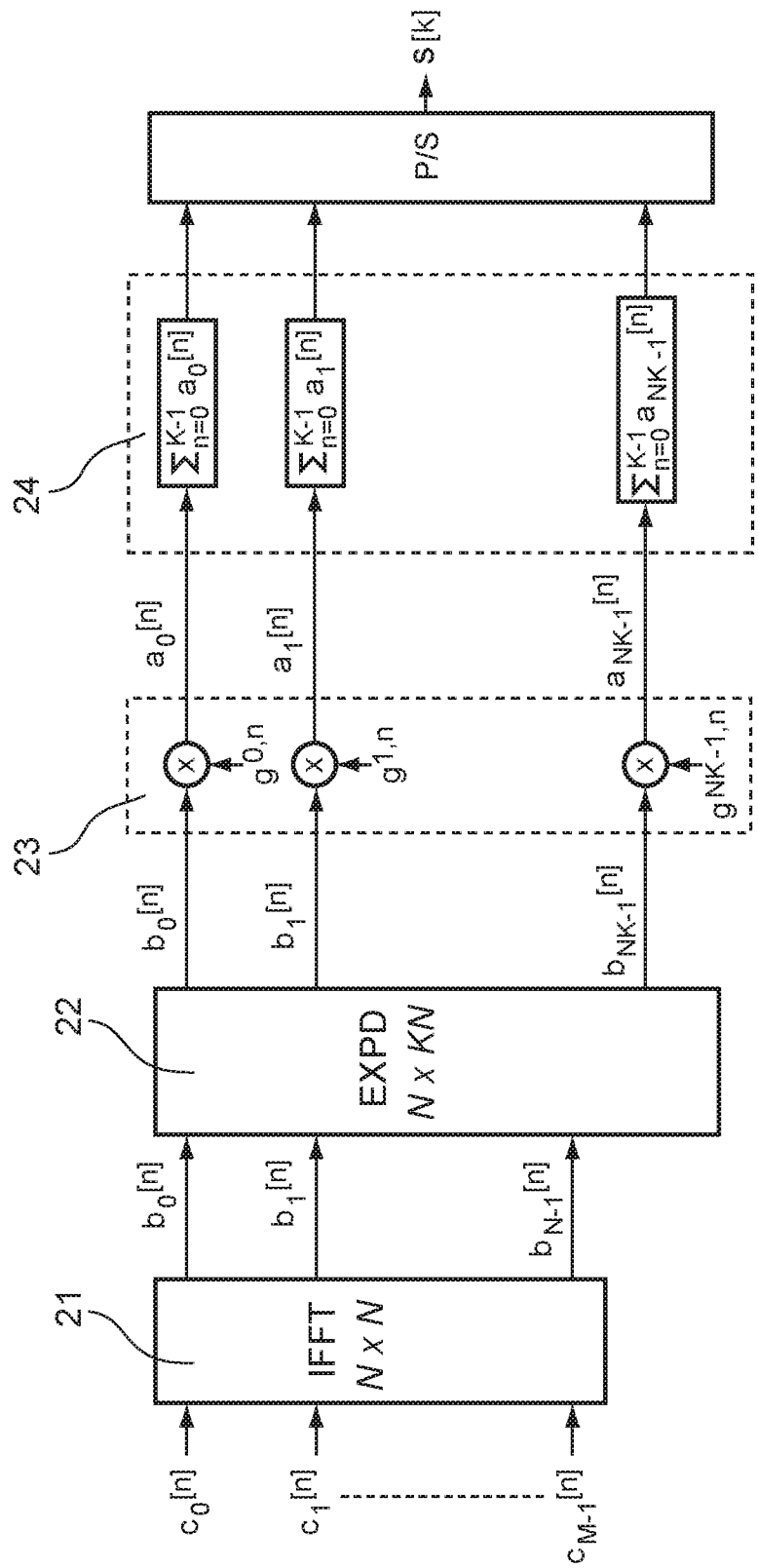
FIG. 4 illustrates an example of a GFDM type transmitter implementing the steps of FIG. 2.

According to this example, illustrated in FIG. 4, the proposed solution relies on the preliminary implementation of an IDFT type transformation 21 for each set of M data symbols $c_m[n]$ (i.e. each column of the block of data symbols) feeding M sub-carriers. The coefficients resulting from this operation are then filtered temporally 23 after repetition/cyclic extension 22.

This amounts to expressing the multi-carrier GFDM signal in baseband in the following form, for $0 \leq k \leq NK-1$:

$$s[k] = \underbrace{\sum_{n=0}^{K-1} \underbrace{\sum_{m=0}^{M-1} c_m[n] e^{\frac{j2\pi km}{M}}}_{b_k[n]} \tilde{g}[k-nN]}_{filtering}$$

with: $\tilde{g}[k]$ being a shaping filter obtained by periodic repetition of the prototype filter $g[k]$ on a period NK: $\tilde{g}[k]=g[\mathrm{mod}(k,NK)]$.

More specifically, the modulated outputs $b_k[n]$, for $k \in [0, N-1]$, also called transformed symbols can be obtained by applying, to the M data symbols, possibly complemented by (N−M) zero symbols if N>M, an IFDT 21 sized N along the frequency axis.

These modulated outputs $b_k[n]$ can then be extended 22 cyclically on the interval $k \in [0,KN-1]$ by the relationship:

$$b_k[n] = b_{k+N}[n]$$

so as to obtain NK repeated symbols.

These NK repeated symbols can then be filtered 23. To this end, the operation can be based on the principle of polyphase filtering as recalled especially in "*Multirate systems and filter banks*" (P. P. Vaidyanathan, Prentice Hall, Englewood Cliffs, New-York, New Jersey, 1993, chapter 4). The cost of the filtering operation can be reduced by using the shaping filter $\tilde{g}[k]$. Thus, as illustrated in FIG. 4, each repeated symbol $b_k[n]$, for $0 \leq k \leq NK-1$, is multiplied by a coefficient $g^{k,n}$ of the shaping filter, so as to obtain NK filtered symbols denoted as $a_k[n]$, for $0 \leq k \leq NK-1$.

It can be noted that the coefficients $g^{k,n}$ of r the shaping filter, shifted at each time slot indexed n, can be deduced from the expression of the prototype filter with different indexing values. Thus, once the variables M, N and K are fixed, the coefficients of the shaping filter can be precomputed (for example offline) and stored in tables for $n=0 \ldots K-1$.

Besides, the operation of cyclic repetition/expansion 23 is simply proposed by way of an illustration. In practice, it is not necessary to allocate additional memories for the storage of the data to be copied out. It is enough to use the same data periodically.

The filtered symbols $a_k[n]$ are then summed up branch by branch, so as to add up all the first filtered symbols obtained for the different columns of the block, according to the equation $\Sigma_{n=0}^{K-1} a_0[n]$, and then all the second filtered symbols obtained for the different columns of the block, according to the equation $\Sigma_{n=0}^{K-1} a_1[n]$, etc., and finally, all the last filtered symbols obtained for the different columns of the block, according to the equation $\Sigma_{n=0}^{K-1} a_{NK-1}[n]$.

The expression of the multi-carrier signal GFDM can also be given in matrix form:

$$s_{NK \times 1} = \mathrm{diag}\left\{G_{NK \times K} \underbrace{(E_{NK \times N} W_{N \times N} C_{N \times K})^T}_{Q_{K \times NK}}\right\}$$

with: $C_{N \times K} = \{c_m[n]\}_{N \times K}$ being the matrix of data symbols sized N×K, complemented by zero symbols if N>M, for input indices $m \in [0,M-1]$ and $n \in [0,K-1]$;

$$W_{N \times N} = \left\{e^{\frac{j2\pi km}{M}}\right\}_{N \times N}$$

the IDFT matrix sized N×N, with input indices $(m,k) \in [0, N-1]$;

$E_{NK \times N}$ the matrix representing the cyclic repetition sized NK×N, such that a $E_{NK \times N}^T = [I_{N \times N} \ldots I_{N \times N}]_{N \times NK}$;

$G_{NK \times K} = \{g^{k,n}\}_{NK \times K} = \{g[\mathrm{mod}(k-nN,NK)]\}_{NK \times K}$ the matrix representing the filtering by the shaping filter $\tilde{g}[k]$, also called a circulating polyphase matrix, sized NK×K, for $k \in [0,NK-1]$ and $n \in [0,K-1]$;

$(\bullet)^T$ being the matrix transpose operator;

$\mathrm{diag}\{\bullet\}$ being the operator for extracting the diagonal elements of a matrix.

To arrive at an efficient implementation, an IFFT algorithm is applied for the computation of the IDFT while the operation of expansion by N does not require computations. Besides, the operation for extracting diagonal terms suggest that only the operations concerning the diagonal elements of $G_{NK \times K} Q_{K \times NK}$ are to be computed, i.e. for $s[k]$ with $k \in [0, NK-1]$, only the multiplication between the $k^{th}$ line of the vector of $G_{NK \times K}$ and the $k^{th}$ column of the vector of $Q_{K \times NK}$ is taken into account.

In terms of complexity, it is noted that the proposed solution reduces the number of complex multiplications to K IFFT computations sized N as well as to K multiplications between the outputs of the IFFT and the coefficients $g^{k,n}$ of the shaping filter. Assuming that the prototype filter $g[k]$ has real-value coefficients, each of the multiplications is taken into account for ½ complex multiplications. Thus, according to the embodiment illustrated in FIG. 4, the total complexity for producing a GFDM block rises in terms of number of complex multiplications to:

$$CM_{inv} = (KN \log_2 N \, K^2 N)/2$$

In addition, for the inactive time slots, the proposed algorithm directly reduces the complexity. Indeed, similarly to the OFDM, since the proposed algorithm uses an IFFT on the frequency axis, there is independence between the different time slots. For this reason, the complexity can be reduced in taking into account only K active slots.

Besides, the performance values obtained by using a GFDM type transmission system according to the invention are similar to those obtained with direct implementation of the GFDM.

Here below, referring to FIGS. 5A and 5B, we describe an example of implementation of the invention for the reception of a multi-carrier signal transmitted according to a GFDM type technique. According to this example, a process is carried out that is the reverse of the one implemented on the sending side.

The general expression for the estimation of at least one data symbol, for a block, at the position $(m_0, n_0)$ in the time-frequency plane is given by:

$$y_{m_0,n_0} = \sum_{k=0}^{KN-1} s[k]\tilde{g}^*_{m_0,n_0}[k]$$

with: s[k] being the GFDM type multi-carrier signal.
In developing the expression $\tilde{g}_{m_0,n_0}$, we obtain:

$$y_{m_0,n_0} = \sum_{k=0}^{MK-1} s[k]\tilde{g}[k - n_0 N]e^{-\frac{j2\pi m_0 k}{M}}$$

$$y_{m_0,n_0} = \sum_{k=0}^{M-1} \underbrace{\sum_{l=0}^{K-1} s[k+lM]\tilde{g}[k+lM-n_0N]e^{-\frac{j2\pi m_0(k-n_0 N)}{M}}}_{\text{filtering}}$$
$$\underbrace{\phantom{xxxxxxxxxxxxxxxxxxxxxxxxxxxxxxxxxxxxxxxxxxxxxxxxxxxxxxxxxxxxx}}_{\text{FFT}}$$

More specifically, according to the example illustrated in FIG. 5A, the NK samples of the received multi-carrier signal s[k] are filtered (32), in multiplying each sample indexed k, for 0≤k≤NK−1, by a coefficient $g^{k,n}$ of the shaping filter, so as to obtain NK filtered samples, denoted as $u_k$.

As illustrated in FIG. 5B, these filtered samples $u_k$ are distributed 33 into K groups of N filtered samples, denoted as $G_0, G_1, \ldots, G_{K-1}$. Then, the filtered samples of the K groups $G_0, G_1, \ldots, G_{K-1}$ are added up 34 so as to obtain N filtered symbols denoted as $v_k$, for 0≤k≤K−1. For example, the N first filtered samples of the groups $G_0, G_1, \ldots, G_{K-1}$ are added up and then the second filtered samples of the groups $G_0, G_1, \ldots, G_{K-1}$, are added together, etc., and finally the last filtered samples of the groups $G_0, G_1, \ldots, G_{K-1}$ are added together.

The N filtered symbols are then transformed 35 from the time domain to the frequency domain. If N>M, then we obtain N transformed symbols and only the M first transformed symbols are kept. The M first transformed symbols correspond to the M estimated data symbols.

It is also possible to write the expression of the estimated data symbols in matrix form:

$$y_{N\times 1} = W_{N\times N}^H E_{NK\times N}^T D_{NK\times NK} s_{NK\times 1}$$

with: $W_{N\times N}^H$ being the matrix representing the DFT transform, sized N×N, with input indices (m,k)∈[0,N−1];

$E_{NK\times N}^T = [I_{N\times N} \ldots I_{N\times N}]_{N\times NK}$ being the matrix representing the distributing and summing steps;

$D_{NK\times NK} = \text{diag}(g^{k,n})$ being the matrix representing the filtering by the shaping filter $\tilde{g}[k]$, obtained by periodic repetition of a prototype filter g[k] on a period NK and such that $\tilde{g}[k]=g[\text{mod}(k, NK)]$, with $g^{k,n}$ being the coefficients of the shaping filter, diag{•} being the operator for extracting diagonal elements from a matrix, sized NK×NK, for k∈[0, NK−1] and n∈[0,K−1];

$s_{NK\times 1}$ being a vector representing the NK samples of the multi-carrier signal;

$(•)^T$ being the matrix transpose operator;
$(•)^H$ being matrix conjugate-transpose operator.

6.3 Alternative Mode of Implementation

Here below, we present an alternative implementation, used especially to generate a quasi-orthogonal GFDM type system.

It may be recalled that the SoA algorithm, as presented with reference to the prior art, carries out circular spectral shaping in the frequency domain. In particular, in the document "*Generalized Frequency Division Multiplexing: Analysis of an Alternative Multi-Carrier Technique for Next Generation Cellular Systems*" mentioned here above, the technique described uses a square-root raised cosine (SRRC) shaping filter with a length NK for this filtering operation. Since several coefficients of the SRRC filter are almost zero in the frequency domain, the complexity can be easily reduced in considering only the support L of the non-zero coefficients. In particular, as described with reference to the prior art, the complexity of the SoA algorithm depends on the support L, also called a span factor. In the example of an SRRC type shaping filter, this support L is set at 2.

It is proposed, according to one alternative mode of implementation, that this span factor should be determined in taking account of the values assumed by the other parameters of the transmission system.

In particular, it can be noted that in a GFDM type transmission system where each sub-carrier is over-sampled by a factor N and comprises time slots of Ksymbols, the length of the SRRC filter is equal to NK (i.e. the shaping filter comprises NK coefficients denoted as $g^{k,n}$, for k∈[0, NK−1]. As a consequence, its effective bandwidth in Hertz is equal to $$BW = \frac{1+\alpha}{NT_s},$$

with:
α being the roll-off factor of the filter, and
$T_s$ the sampling period (in seconds).

When the frequency coefficients of the SRRC filter are computed by DFT sized NK, it means that the frequency resolution is $$\left(\frac{1}{NKT_s}\right),$$

so that the approximate value of the support parameter is expressed by:

$$L_{approx} = 2\left\lceil \frac{K(1+\alpha)}{2} \right\rceil - 1$$

with ⌈•⌉ being the rounded up integer value.

Now, optimizing the parameter L can, if necessary, transform a non-orthogonal GFDM system into a quasi-orthogonal GFDM system.

To this end, it is shown here below that the value of the support results from a compromise made in choosing a span factor such that $L<L_{approx}$. By reducing the value of L in cancelling the edge coefficients, relative to $L_{approx}$, the interference between sub-carriers (or inter-carrier interference or ICI) produced by the neighboring carriers is naturally cancelled. However, the prototype filter becomes a modified SRRC filter which no longer complies with the Nyquist condition, which means that for each sub-carrier there is a loss of orthogonality along the time axis (ISI or inter-symbol interference). As a consequence, the greater the extent to which the edge coefficients are cancelled, the greater is the reduction in inter-carrier interference is reduced but the greater is the increase in the inter-symbol interference. An intensive analysis of this compromise shows that there is a threshold value of L, for which the inter-carrier interference is completely cancelled out. However if, beyond this threshold value, we continue to reduce L, the only effect is to increase the inter-symbol interference.

This threshold value is expressed by:

$$L_{thres} = L_{approx}(\alpha = 0) = 2\left\lceil \frac{K}{2} \right\rceil - 1$$

As a consequence, it is possible to set this support parameter to reach optimal performance. This technique is denoted here below as SFM or Span-Factor Manipulation.

This SFM technique tends to favor the SRRC filters having a low-value roll-off factor since, in this case, the edge coefficients are appreciably smaller than those situated close to the central sub-carriers. As a consequence, cancelling out has only a fairly small effect on the Nyquist condition for the resulting system whereas the interference between sub-carriers is reduced.

FIG. 6 illustrates especially the performance of a GFDM transmission system using an adapted filter with and without SFM and the performance of an OFDM transmission system in the case of transmission in a channel disturbed by a white Gaussian noise (AWGN), with M=N=128, K=15 and α=0,1.

This FIG. 6 shows that it is possible to pass from a system recognized as being non-orthogonal (GFDM without SFM) to a quasi-orthogonal system in choosing a support equal to the threshold value $L_{thres}$. Indeed, the curves representing an error rate (symbol error rate or SER) as a function of the signal-to-noise ratio (SNR) for OFDM transmission (OFDM curve) and GFDM transmission with a span factor $L=L_{thres}$ (GFDM SFM $L=L_{thres}$ curve) are almost superimposed.

Besides, as anticipated, reducing the length of the support L below this threshold value results in a deterioration of performance (curves GFDM SFM $L=L_{thres}-1$ and GFDM SFM $L=L_{thres}-2$).

In a contrasted way, for the SRRC filters having a high-value roll-over factor, several coefficients close to the edges takes high values so much so that their cancellation prompts a notable change in the SRRC filter which then severely violates the Nyquist criterion. It can be seen that the SFM always works accurately for such a GFDM system but proves to perform less well than in the case of low-value roll-off factor. Indeed, the SFM then increases the inter-symbol interference on each carrier.

It can be noted that such a technique for optimizing the value of the support parameter (SFM) can be implemented to determine the coefficients of the shaping filter used in the GFDM type transmission and reception techniques described according to the invention or else in the GFDM type transmission and reception techniques according to the prior art, and especially according to the SoA technique.

In addition, in one case as in the other, the SFM does not have any impact on the complexity of the system because it can be done offline.

In particular, it can be noted that the number of data symbols per slot, K, is not necessarily an integer power of 2. In fact, the analysis of the support of the SRRC filter has shown that for the low values of K (of the order K<20), the value obtained is always an odd-parity value because the support can be symmetrical relative to the center frequency of the sub-carriers.

6.4 Improvement of the Power Spectral Density

Whatever the scheme chosen to implement a GFDM transmitter, it is possible to insert a cyclic prefix or more generally a guard interval denoted as CP in the multi-carrier signal s[k], prior to its transmission. This cyclic prefix or guard interval makes it possible to cancel out the inter-block interference of the GFDM system and therefore obtain almost perfect orthogonality in the case of a multi-path channel.

In addition, to prevent the spectral leakage due to the block-based processing from leading to in poor spectral power density, it is proposed in one special embodiment of the invention to apply a windowing operation after the operation for inserting the cyclic prefix.

Thus, a windowed multi-carrier signal denoted as WCP-GFDM is obtained.

We consider a cyclic prefix with a length $L_{CP}$, such that $L_{CP}=L_{RI}$, with $L_{GI}$ being the length of a first portion of the cyclic prefix used to absorb the interference due to the transmission channel (which can possibly be equal to zero) and $L_{RI}$ being the length of a second portion of the cyclic prefix used to improve the power spectrum of the multi-carrier signal, i.e. the length of the second portion of the cyclic prefix attached to the windowing operation (which is necessarily greater than zero and lower than or equal to $L_{GI}$).

In particular, the $l^{th}$ block of the windowed multi-carrier signal $s_{WCP-GFDM}[k]$, for k=0 . . . $KN+L_{CP}-1$, can be obtained for the $l^{th}$ block of the multi-carrier signal before insertion of the cyclic prefix, previously denoted as s[k], for k=0 . . . KM−1, by the following expression:

$$s_{WCP-GFDM}[k] = \sum_{r=l-1}^{l+1} s[\mathrm{mod}(k - L_{CP}, KN)]h[k - r(KN + L_{GI})]$$

with: s being the multi-carrier signal before insertion of the cyclic prefix;
l being the index of the block considered;
h[k] being a window function defined in the slot k=0 . . . $KN+L_{CP}-1$;
r being an integer taken in the interval [l−1,l+1].

For example, the window function h[k] is defined as follows:

$$h[k] = \begin{cases} \text{windowing coefficients} & \text{if } k \in [0, L_{RI} - 1] \\ h[KN + L_{CP} - 1 - k] & sik \in [KN + L_{CP} - L_{RI}, KN + L_{CP} - 1] \\ 1 & \text{else} \end{cases}$$

where the windowing coefficients depend on the windowing chosen (for example Hamming type, Hanning type, etc.).

Figure 1:
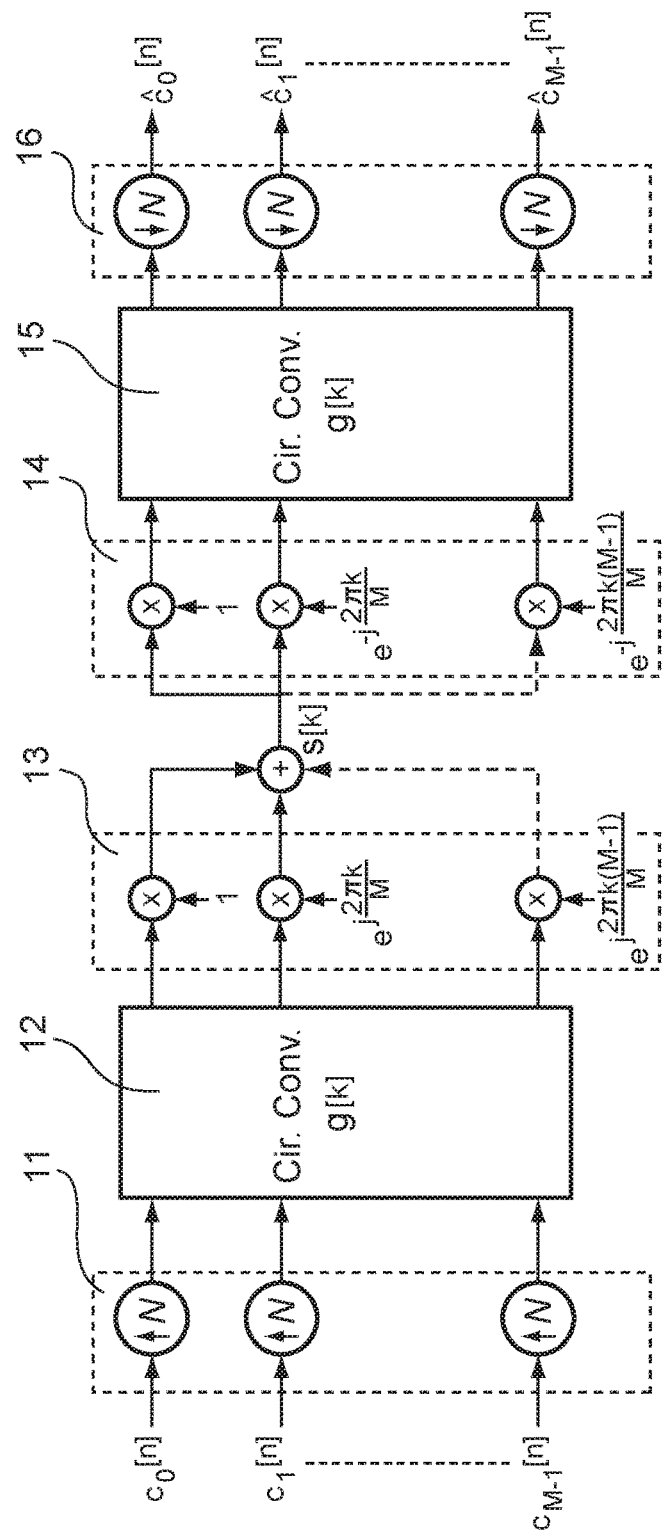

Thus, as illustrated in FIG. 9, in one embodiment of the invention, the method for transmitting also implements a step 91 for inserting a cyclic prefix before at least one time sample forming the multi-carrier signal s[k] (obtained according to the scheme of FIG. 1 for a direct implementation or according to the scheme of FIG. 4 for an implementation with reduced complexity) and possibly a windowing step 92.

More specifically, the windowing step 92 implements:
 a multiplication 921 of each of the NK time samples forming the multi-carrier signal and the cyclic prefix by a windowing coefficient, delivering $KN+L_{CP}$ windowed samples;
 an oversampling 922 by an oversampling factor $Q=KN+L_{GI}$ of the windowed samples, delivering $KN+L_{CP}$ oversampled samples;

a shifting and a summing 923 of the oversampled samples, delivering the windowed multi-carrier signal $s_{WCP\text{-}GFDM}[k]$.

It can be noted that the series/parallel conversion block 90 of FIG. 9, just as the parallel/series conversion block of FIG. 4, are optional if the steps of insertion of a cyclic prefix 91 and of windowing 92 are directly implemented on the NK time samples.

The windowed multi-carrier signal $s_{WCP\text{-}GFDM}[k]$ thus obtained has high properties in terms of power spectral density and orthogonality.

One of the advantages of such a technique of transmission implementing the insertion of a cyclic prefix and a windowing operation is that the receiver receiving the windowed multi-carrier signal $s_{WCP\text{-}GFDM}[k]$ can have a hybrid equalization scheme. Such flexibility enables especially the receiver to decide how to decode the payload data/information part as a function of the characteristics of dispersion of the transmission channel.

We thus present two modes of reception according to the position of the equalization step in the reception chain.

According to a first mode of reception illustrated in FIG. 10, prior to the estimation step, the method implements the following steps:

elimination 1010 from the multi-carrier signal $s_{WCP\text{-}GFDM}[k]$, of the first portion of length $L_{GI}$ of the cyclic prefix;

cyclic shift 1011 ($\Delta$) of the multi-carrier signal obtained from the elimination step such that $s[k]=s[\mod(k+L_{GI}, KN)]$, for $k=0, \ldots KN-1$, delivering NK time samples;

transformation 1012 of the NK time samples from the time domain to the frequency domain in using for example an FFT sized KN×KN, delivering NK frequency samples;

equalization 1013 of the NK frequency samples delivering NK equalized samples;

transformation 1014 of the NK equalized samples from the frequency domain to the time domain.

The NK time samples obtained at the end of the transformation step 1014 are then processed as described with reference to FIG. 5A or 5B (or possibly FIG. 1), by applying to them:

a filtering 32 delivering NK filtered samples, a group-based distribution 33/summing 34 delivering N filtered symbols, a transformation 35 delivering M estimated complex symbols denoted as $\hat{c}_n$.

In this first mode of reception, the equalization is implemented in the frequency domain and implements for example a zero-forcing type algorithm.

According to a second mode of reception, illustrated in FIG. 11, prior to the estimation step, the method implements the following steps:

elimination 1110, from the multi-carrier signal, of the first portion of length $L_{GI}$ of the cyclic prefix;

cyclic shift 1111 ($\Delta$) of the multi-carrier signal obtained from the elimination step such that $s[k]=s[\mod(k+L_{GI}, KN)]$, for $k=0, \ldots KN-1$, delivering NK time samples.

The NK time samples obtained from the cyclic shift step 1111 are then processed as described with reference to FIG. 5A or 5B (or possibly FIG. 1), and then equalized. Thus, the NK time samples obtained from the cyclic shift step 1111 are processed by applying to them:

a filtering operation 32 delivering NK filtered samples, a group-based distribution 33/summing 34 delivering N filtered symbols, a transformation 35 delivering M transformed symbols, an equalization 1112 of the transformed symbols delivering M estimated complex symbols denoted as $\hat{c}_{m,n}$.

In this second mode of reception, the equalization is implemented in the frequency domain and implements for example a zero-forcing type of algorithm.

6.5 Structures of the Transmission and Reception Devices

Finally, referring to FIGS. 7 and 8 respectively, we present the simplified structure of a transmission device implementing especially a GFDM type modulation and the structure of a reception device implementing especially a GFDM type demodulation according to one particular embodiment of the invention.

As illustrated in FIG. 7, such a transmission device comprises a memory 71 comprising a buffer memory, a processing unit 72, equipped for example with a microprocessor µP, and driven by the computer program 73 implementing the method for transmitting according to one embodiment of the invention.

At initialization, the code instructions of the computer program 73 are for example loaded into a RAM and then executed by the processor of the processing unit 72. The processing unit 72 inputs at least one block of data symbols, that are real or complex, denoted as $\{c_m[n]\}_{M \times K}$. The microprocessor of the processing unit 72 implements the steps of the method for transmitting described here above according to the instructions of the computer program 73 to generate a multi-carrier signal $s[k]$. To this end, the transmission device comprises, in addition to the buffer memory 71, a module for shaping the block or blocks of complex data symbols comprising the following modules:

a module for transforming the M data symbols of a column of the block from the frequency domain to the time domain, delivering N transformed symbols with $N \geq M$;

a module for the cyclic repetition of the N transformed symbols delivering NK repeated symbols;

a module for filtering by a shaping filter of the NK repeated symbols delivering NK filtered symbols; and a module for summing the filtered symbols obtained for the different columns of the block delivering NK time samples forming the multi-carrier signal.

These modules are driven by the microprocessor of the processing unit 72.

As illustrated in FIG. 8, such a reception device comprises a memory 81 comprising a buffer memory, a processing unit 82, equipped for example with a microprocessor µP, and driven by the computer program 83 implementing the method for receiving according to one embodiment of the invention.

At initialization, the code instructions of the computer program 83 are for example loaded into a RAM and then executed by the processor of the processing unit 82. The processing unit 82 inputs a multicarrier signal $s[k]$. The microprocessor of the processing unit 82 implements the steps of the method for receiving described here above according to the instructions of the computer program 83 to estimate the data symbols transmitted. To this end, the device for receiving comprises, in addition to the buffer memory 81, a module for estimating at least one complex data symbol of the block, comprising:

a module for obtaining a multi-carrier signal comprising NK samples with $N \geq M$;

a module for filtering the NK samples by means of a shaping filter, delivering NK filtered samples;

a module for distributing the NK filtered samples among K groups of N filtered samples;

a module for summing up the filtered samples of the K groups, delivering N filtered symbols;

a module for transforming the N filtered symbols from the time domain to the frequency domain delivering M estimated data symbols.

These modules are driven by the microprocessor of the processing unit 82.

The invention claimed is:

1. A method for transmitting complex data symbols, to be implemented in a telecommunications system, comprising:
shaping at least one block of M×K complex data symbols with M>1 and K>1 implementing the following acts:
for at least one column of said at least one block:
transformation of the M complex data symbols of said at least one column from the frequency domain to the time domain, delivering A transformed symbols with N≥M;
cyclic repetition of said N transformed symbols, delivering NK repeated symbols; and
filtering said NK repeated symbols by using a shaping filter, delivering NK filtered symbols, wherein the shaping filter is a modified square root raised cosine filter comprising, in the frequency domain, zero coefficients and non-zero coefficients and, for which a support L of the non-zero coefficients of said filter is such that:

$$L = 2\left\lceil \frac{K(1+\alpha)}{2} \right\rceil - 1,$$

with being a rounded-up integer part operator and α being a roll-off factor of the shaping filter; and
summing said filtered symbols obtained for the at least one column of said at least one block, delivering NK time samples forming a multi-carrier signal; and
transmitting the multi-carrier signal in the telecommunications system.

2. The method for transmitting according to claim 1, wherein said act of transformation applies an inverse fast Fourier transform of sized N×N to the M complex data symbols if N=M, and to the M complex data symbols complemented by (N−M) zero symbols if N>M.

3. The method for transmitting according to claim 1, wherein shaping the at least one block of M×K complex data symbols delivers the multi-carrier signal such that:

$$s_{NK \times 1} = \mathrm{diag}\{G_{NK \times K}(E_{NK \times N} W_{N \times N} C_{N \times K})^T\}$$

with: $C_{N \times K} = \{c_m[n]\}_{N \times K}$ being said at least one block of complex data symbols, complemented by zero elements if N>M, for 0≤n≤K−1, 0≤m≤M−1;

$$W_{N \times N} = \left\{ e^{j\frac{2\pi km}{M}} \right\}_{N \times N}$$

being a matrix representing the step of transformation from the frequency domain to the time domain, for 0≤k≤N−1, 0≤m≤N−1;
$E_{NK \times N}$ being a matrix representing the cyclic repetition step such that $E_{NK \times N}{}^T = [I_{N \times N} \ldots I_{N \times N}]_{N \times NK}$;
$G_{NK \times K} = \{g^{k,n}\}_{NK \times K} = \{g[\mathrm{mod}(k-nN, NK)]\}_{NK \times K}$ being a matrix representing the step of filtering by the shaping filter $\tilde{g}[k]$, obtained by periodic repetition of a prototype filter g[k] on a period NK and such that $\tilde{g}[k] = g[\mathrm{mod}(k, NK)]$, for 0≤k≤NK−1, 0≤n≤K−1;

$(\bullet)^T$ being a matrix transpose operator;

$\mathrm{diag}\{\bullet\}$ being an operator for extracting the diagonal elements of a matrix.

4. The method for transmitting according to claim 1, wherein said shaping filter is a modified square-root raised cosine filter such that:

$$L = 2\left\lceil \frac{K}{2} \right\rceil - 1.$$

5. The method for transmitting according to claim 1, wherein the method comprises:
inserting a cyclic prefix before at least one time sample forming said multi-carrier signal, said cyclic prefix, of a length $L_{CP} = L_{GI} + L_{RI}$, comprising a first portion with a length $L_{GI}$, used to absorb transmission channel interference, and a second portion with a length $L_{RI}$, used to improve a power spectrum of said multi-carrier signal, and
windowing said multi-carrier signal implementing the following acts:
multiplying each of said at least one time sample forming said multi-carrier signal and said cyclic prefix by a windowing coefficient, delivering $KN+L_{CP}$ windowed samples;
over-sampling said windowed samples by an over-sampling factor $Q = KN + L_{GI}$, delivering $KN + L_{CP}$ over-sampled windowed samples;
shifting and summing said over-sampled windowed samples, delivering e windowed multi-carrier signal.

6. A device for transmitting complex data symbols, to be implemented in E telecommunications system, delivering a multi-carrier signal, wherein the device comprises:
a processor; and
a non-transitory computer-readable medium comprising instructions stored thereon which when executed by the processor configure the device to shape at least one block of M×K complex data symbols, with M>1 and K>1, comprising the following acts:
for at least one column of said at least one block:
transforming the M complex data symbols of said at least one column from the frequency domain to the time domain, delivering N transformed symbols with N≥M;
cyclically repeating said N transformed symbols, delivering NK repeated symbols; and
filtering said NK repeated symbols by using a shaping filter, delivering NK filtered symbols; and
summing said filtered symbols obtained for the at least one column of said at least one block, delivering NK time samples forming said multi-carrier signal;
inserting a cyclic prefix before at least one time sample forming said multi-carrier signal, said cyclic prefix, of a length $L_{CP} = L_{GI} + L_{RI}$, comprising a first portion with a length $L_{GI}$, used to absorb transmission channel interference, and a second portion with a length $L_{RI}$, used to improve a power spectrum of said multi-carries signal; and
windowing said multi-carrier signal implementing the following acts:
multiplying each of said at least one time sample forming said multi-carrier signal and said cyclic prefix by a windowing coefficient, delivering KN+$L_{CP}$ windowed samples;

over-sampling said windowed samples by an over-sampling factor Q=KN+$L_{GI}$, delivering KN+$L_{CP}$ over-sampled samples;

shifting and summing said over-sampled windowed samples, delivering a windowed multi-carrier signal; and transmitting the windowed multi-carrier signal in the telecommunications system.

7. A method for receiving comprising:

receiving a multi-carrier signal from a telecommunications system, said multi-carrier signal having been obtained by shaping at least one block of M×K complex data symbols when sending, with M>1 and K>1;

estimating at least one complex data symbol of said at least one block, implementing the following acts:

obtaining the multi-carrier signal, which comprises NK samples, with N≥M;

filtering said NK samples by using a shaping filter, delivering NK filtered samples;

distributing said NK filtered samples amongst K groups of N filtered samples;

summing said filtered samples of the K groups delivering N filtered symbols;

transforming the N filtered symbols from the time domain to the frequency domain, delivering M estimated complex data symbols; and prior to the act of estimating, implementing the following acts:

elimination, from the multi-carrier signal, of a first portion of a cyclic, prefix having a length $L_{CP}=L_{GI}+L_{RI}$ inserted when sending, said first, portion having a length $L_{GI}$ and being used to absorb transmission channel interference;

cyclic shifting of the multi-carrier signal obtained from the elimination act, such that s[k]=s[mod(k+$L_{GI}$, KN)], delivering NK time samples; transformation of the NK time samples from the time domain to the frequency domain, delivering NK frequency samples;

equalization of the NK frequency samples, delivering NK equalized samples; and transformation of the NK equalized samples from the frequency domain to the time domain.

8. The method for receiving according to claim 7, wherein said act of transformation implements a fast Fourier transform sized N×N and, if N>M, an extraction of the M first transformed filtered symbols, delivering said M estimated complex data symbols.

9. The method for receiving according to claim 7, wherein said act of estimating at least one complex data symbol of said at least one block delivers an estimated data symbol at the position ($m_0$, $n_0$), such that:

$$y_{m_0,n_0} = \sum_{k=0}^{M-1} \sum_{l=0}^{K-1} s[k+lM]\tilde{g}[k+lM-n_0N]e^{\frac{-j2\pi m_0(k-n_0N)}{M}}$$

with: s[k] being the multi-carrier signal;
$\tilde{g}$[k] being the shaping filter.

10. The method for receiving according to claim 7, wherein said act of estimating at least one complex data symbol of the at least one block delivers an estimated data symbol at the position ($m_0$, $n_0$), such that:

$$y_{N\times 1} = W_{N\times N}^H E_{NK\times N}^T D_{NK\times NK} s_{NK\times 1}$$

with: $W_{N\times N}^H$ being a matrix representing said act of transformation from the time domain to the frequency domain;

$E_{NK\times N}^T = [I_{N\times N} \ldots I_{N\times N}]_{N\times NK}$ being a matrix representing distributing and summing steps;

$D_{NK\times NK} = \text{diag}(g^{k,n})$ being a matrix representing the step of filtering by using the shaping filter $\tilde{g}$[k], obtained by periodic repetition of a prototype filter g[k] over a period NK and such that $\tilde{g}$[k]=g[mod(k, NK)], with $g^{k,n}$ being coefficients of the shaping filter, diag{•} being an operator for extracting the diagonal elements of a matrix, 0≤n≤K−1, and 0≤k≤NK−1;

$s_{NK\times 1}$ being a vector representing the NK samples of the multi-carrier signal;

$(•)^T$ being a matrix transpose operator;

$(•)^H$ being a matrix conjugate-transpose operator.

11. A device for receiving a multi-carrier signal, to be implemented in a telecommunications system, delivering estimated complex data symbols, said multi-carrier signal being obtained by shaping, when sending, at least one block of M×K complex data symbols, with M>1 and K>1, wherein said device comprises:

a processor; and a non-transitory computer-readable medium comprising instructions stored thereon, which when executed by the processor configure the device to perform acts comprising:

estimating at least one complex data symbol of the at least one block, comprising:

obtaining the multi-carrier signal, which comprises NK samples, with N≥M;

filtering the NK samples by using a shaping filter, delivering NK filtered samples;

distributing the NK filtered samples amongst K groups of N filtered samples;

summing the filtered samples of the K groups, delivering N filtered symbols; and transforming the N filtered symbols from the time domain to the frequency domain, delivering M estimated complex data symbols; and prior to the act of estimating, implementing the following acts:

elimination, from the multi-carrier signal, of a first portion of a cyclic prefix having a length $L_{CP}=L_{GI}+L_{RI}$ inserted when sending, said first portion having a length $L_{GI}$ and being used to absorb transmission channel interference;

cyclic shifting of the multi-carrier signal obtained from the elimination act, such that s[k]=s[mod(k+$L_{GI}$, KN)], delivering NK time samples;

transformation of the NK time samples from the time domain to the frequency domain, delivering NK frequency samples;

equalization of the NK frequency samples, delivering NK equalizes samples; and transformation of the NK equalized samples from the frequency domain tc the time domain.

12. A method for transmitting complex data symbols, to be implemented in a telecommunications system, comprising:

shaping at least one block of M×K complex data symbols with M>1 and K>1 implementing the following acts:

for at least one column of said at least one block:

transformation of the M complex data symbols of said at least one column from the frequency domain to the time domain, delivering N transformed symbols with N≥M;

cyclic repetition of said N transformed symbols, delivering NK repeated symbols; and filtering said NK repeated symbols by using a shaping filter, delivering NK filtered symbols; and summing said filtered symbols obtained for the at least one column of said at least one block, delivering NK time sample, forming a multi-carrier signal; and inserting a cyclic prefix before at least one time sample forming said multi-carrier signal, said cyclic prefix, of a length $L_{CP}=L_{GI}+L_{RI}$, comprising a first portion with a length $L_{GI}$, used to absorb transmission channel interference, and a second portion with a length $L_{RI}$, used to improve a power spectrum of said multi-carrier signal, and windowing said multi-carrier signal implementing the following acts:

multiplying each of said at least one time sample forming said multi-carrier signal and said cyclic prefix by a windowing coefficient delivering $KN+L_{CP}$ windowed samples;

over-sampling said windowed samples by an over-sampling factor $Q=KN+L_{GI}$, delivering $KN+L_{CP}$ over-sampled samples;

shifting and summing said over-sampled windowed samples, delivering a windowed multi-carrier signal, transmitting the windowed multi-carrier signal in the telecommunications system.

13. The method for transmitting according to claim 12, wherein said windowed multi-carrier signal $s_{WCP\text{-}GFDM}[k]$ is such that:

$$s_{WCP\text{-}GFDM}[k] = \sum_{r=l-1}^{l+1} s[\mathrm{mod}(k-L_{CP}, KN)]h[k-r(KN+L_{GI})]$$

with: s[k] being the multi-carrier signal before inserting the cyclic prefix;

l the index of the at least one block considered;

h[k] a window function;

r an integer taken in an interval [l−1, l+1].

14. The method for transmitting according to claim 12, wherein said ac of transformation applies an inverse fast Fourier transform of sized N×N to the M data symbols if N=M, and to the M data symbols complemented by (N−M) zero symbols if N>M.

15. The method for transmitting according to claim 12, wherein said act of shaping the at least one block of M×K complex data symbols delivers the multi-carrier signal such that:

$$s_{NK\times1}=\mathrm{diag}\{G_{NK\times K}(E_{NK\times N}W_{N\times N}C_{N\times K})^T\}$$

with: $C_{N\times K}=\{c_m[n]\}_{N\times K}$ being said at least one block of complex data symbols, complemented by zero elements if N>M, for 0≤n≤K−1, 0≤m≤M−1;

$$W_{N\times N} = \left\{e^{\frac{j2\pi km}{M}}\right\}_{N\times N}$$

being a matrix representing the step of transformation from the frequency domain to the time domain, for 0≤k≤N−1, 0≤m≤N−1;

$E_{NK\times N}$ being a matrix representing the cyclic repetition step such that $E_{NK\times N}^T=[I_{N\times N} \ldots I_{N\times N}]_{N\times NK}$;

$G_{NK\times K}=\{g^{k,n}\}_{NK\times K}=\{\tilde{g}[\mathrm{mod}(k-nN,NK)]\}_{NK\times K}$ being a matrix representing the step of filtering by the shaping filter $\tilde{g}[k]$, obtained by periodic repetition of a prototype filter g[k] on a period NK and such that $\tilde{g}[k]=g[\mathrm{mod}(k,NK)]$, for 0≤k≤NK−1, 0≤n≤K−1;

$(\bullet)^T$ being a matrix transpose operator;

diag{•} being an operator for extracting the diagonal elements of a matrix.

16. The method for transmitting according to claim 12, wherein said shaping filter is a modified square-root raised cosine filter comprising, in the frequency domain, zero coefficients and non-zero coefficients and, for which a support L of the non-zero coefficients of said filter is such that:

$$L = 2\left\lceil\frac{K(1+\alpha)}{2}\right\rceil - 1,$$

with [•] being a rounded-up integer part operator and α being a roll-off factor of the shaping filter.

17. A method for receiving comprising:

receiving a multi-carrier signal from a telecommunications system, said multi-carrier signal having been obtained by shaping at least one block of M×K complex data symbols when sending, with M>1 and K>1;

estimating at least one complex data symbol of said at least one block, implementing the following acts:

obtaining the multi-carrier signal, which comprises NK samples, with N≥M;

filtering said NK samples by using a shaping filter, delivering NK filtered samples;

distributing said NK filtered samples amongst K groups of N filtered samples;

summing said filtered samples of the K groups delivering N filtered symbols;

transforming the N filtered symbols from the time domain to the frequency domain, delivering M estimated complex data symbols;

equalizing the transformed symbols; and implementing the following acts prior to the act of estimating:

eliminating, from the multi-carrier signal, a first portion of a cyclic prefix with a length $L_{CP}=L_{GI}+L_{RI}$ inserted when sending, said first portion having a length $L_{GI}$ and being used to absorb transmission channel interference;

cyclic shifting of the multi-carrier signal obtained from the elimination act, such that $s[k]=s[\mathrm{mod}(k+L_{GI}, KN)]$, delivering NK time samples.

18. The method for receiving according to claim 17, wherein said act of transformation implements a fast Fourier transform sized N×N and, if N>M, an extraction of the M first transformed filtered symbols, delivering said M estimated complex data symbols.

19. The method for receiving according to claim 17, wherein said act of estimating at least one complex data symbol of said at least one block delivers an estimated data symbol at the position ($m_0, n_0$), such that:

$$y_{m_0,n_0} = \sum_{k=0}^{M-1}\sum_{l=0}^{K-1} s[k+lM]\tilde{g}[k+lM-n_0 N]e^{\frac{-j2\pi m_0(k-n_0 N)}{M}}$$

with: s[k] being the multi-carrier signal;
g̃[k] being the shaping filter.

20. The method for receiving according to claim 17, wherein said act of estimating at least one complex data symbol of the at least one block delivers an estimated data symbol at the position ($m_0$, $n_0$), such that:

$$y_{N\times 1} = W_{N\times N}^H E_{NK\times N}^T D_{NK\times NK} s_{NK\times 1}$$

with: $W_{N\times N}^H$ being a matrix representing said act of transformation from the time domain to the frequency domain;

$E_{NK\times N}^T = [I_{N\times N} \cdots I_{N\times N}]_{N\times NK}$ being a matrix representing distributing and summing steps;

$D_{NK\times NK} = \text{diag}(g^{k,n})$ being a matrix representing the step of filtering by using the shaping filter g̃[k], obtained by periodic repetition of a prototype filter g[k] over a period NK and such that g̃[k]=g[mod(k, NK)], with $g^{k,n}$ being coefficients of the shaping filter, diag{•} being an operator for extracting the diagonal elements of a matrix, 0≤n≤K−1, and 0≤k≤NK−1;

$s_{NK\times 1}$ being a vector representing the NK samples of the multi-carrier signal;

$(\cdot)^T$ being a matrix transpose operator;

$(\cdot)^H$ being a matrix conjugate-transpose operator.

21. A device for transmitting complex data symbols, to be implemented in a telecommunications system, delivering a multi-carrier signal, wherein the device comprises:
a processor; and
a non-transitory computer-readable medium comprising instructions stored thereon, which when executed by the processor configure the device to shape at least one block of M×K complex data symbols, with M>1 and K>1, comprising the following acts:
for at least one column of said at least one block:
transforming the M complex data symbols of said at least one column from the frequency domain to the time domain, delivering N transformed symbols with N≥M;
cyclically repeating said N transformed symbols, delivering NK repeated symbols; and
filtering said NK repeated symbols by using a shaping filter, delivering NK filtered symbols, wherein the shaping filter is a modified square-root raised cosine filter comprising, in the frequency domain, zero coefficient and non-zero coefficients and, for which a support L of the non-zero coefficients of said filter is such that:

$$L = 2\left\lceil \frac{K(1+\alpha)}{2} \right\rceil - 1,$$

with [•] being a rounded-up integer part operator and α being a roll-off factor of the shaping filter; and
summing said filtered symbols obtained for the at least one column of said at least one block, delivering NK time samples forming said multi-carrier signal;
transmitting the multi-carrier signal in the telecommunications system.

22. A device for receiving a multi-carrier signal, to be implemented in a telecommunications system, delivering estimated complex data symbols, said multi-carrier signal being obtained by shaping, when sending, at least one block of M×K complex data symbols, with M>1 and K>1, wherein said device comprises:
a processor; and
a non-transitory computer-readable medium comprising instructions stored thereon, which when executed by the processor configure the device to perform acts comprising:
estimating at least one complex data symbol of the at least one block, comprising:
obtaining the multi-carrier signal, which comprises NK samples, with N M;
filtering the NK samples by using a shaping filter, delivering NK filtered samples;
distributing the NK filtered samples amongst K groups of N filtered samples;
summing the filtered samples of the K groups, delivering N filtered symbols; and
transforming the N filtered symbols from the time domain to the frequency domain, delivering M estimated complex data symbols; and
equalizing the transformed N filtered symbols; and
implementing the following acts prior to the act of estimating:
eliminating, from the multi-carrier signal, a first portion of a cyclic prefix with a length $L_{CP}=L_{GI}+L_{RI}$ inserted when sending, said first portion having a length $L_{GI}$ and being used to absorb transmission channel interference;
cyclic shifting of the multi-carrier signal obtained from the elimination act, such that s[k]=s[mod(k+$L_{GI}$,KN)], delivering NK time samples.

* * * * *

UNITED STATES PATENT AND TRADEMARK OFFICE
CERTIFICATE OF CORRECTION

PATENT NO. : 10,103,922 B2
APPLICATION NO. : 14/916431
DATED : October 16, 2018
INVENTOR(S) : Hao Lin et al.

Page 1 of 1

It is certified that error appears in the above-identified patent and that said Letters Patent is hereby corrected as shown below:

In the Claims

In Column 19, Line 60, delete "the step", insert --said act--.
In Column 19, Line 66, delete "the step", insert --said act--.

In Column 20, Line 36, delete "E", insert --a--.
In Column 20, Line 40, after "thereon", insert --,--.

In Column 23, Line 46, delete "ac", insert --act--.

In Column 25, Line 13, delete "steps", insert --acts--.
In Column 25, Line 14, delete "the step", insert --said act--.

In Column 26, Line 26, delete "N M", insert --N≥M--.

Signed and Sealed this
Sixteenth Day of April, 2019

Andrei Iancu
*Director of the United States Patent and Trademark Office*